(12) United States Patent
Denayer (10) Patent No.: US 12,508,337 B2
(45) Date of Patent: Dec. 30, 2025

(54) HOLDER FOR USE IN STERILISATION APPLIANCES

(71) Applicant: Mesa Laboratories, Inc, Lakewood, CO (US)

(72) Inventor: Iwein Denayer, Leest (BE)

(73) Assignee: MESA LABORATORIES, INC., Lakewood, CO (US)

( * ) Notice: Subject to any disclaimer, the term of this patent is extended or adjusted under 35 U.S.C. 154(b) by 873 days.

(21) Appl. No.: 17/290,409

(22) PCT Filed: Nov. 19, 2019

(86) PCT No.: PCT/EP2019/081714
§ 371 (c)(1),
(2) Date: Apr. 30, 2021

(87) PCT Pub. No.: WO2020/104409
PCT Pub. Date: May 28, 2020

(65) Prior Publication Data
US 2021/0386896 A1    Dec. 16, 2021

(30) Foreign Application Priority Data

Nov. 19, 2018  (BE) .................................. 2018/5808
Oct. 13, 2019  (EP) .................................... 19202884

(51) Int. Cl.
*A61L 2/28*     (2006.01)
*C12Q 1/22*     (2006.01)

(52) U.S. Cl.
CPC . *A61L 2/28* (2013.01); *C12Q 1/22* (2013.01)

(58) Field of Classification Search
None
See application file for complete search history.

(56) References Cited

U.S. PATENT DOCUMENTS

| | | | |
|---|---|---|---|
| 3,951,801 A * | 4/1976 | Ayres ....................... | A61J 1/06 422/918 |
| 3,960,670 A | 6/1976 | Pflug | |
| 4,591,566 A | 5/1986 | Smith | |
| 5,240,136 A * | 8/1993 | Patterson ............. | A47G 19/065 206/217 |
| 5,354,483 A * | 10/1994 | Furse ................... | G01N 33/491 210/516 |

(Continued)

OTHER PUBLICATIONS

International Search Report and Written Opinion for the International Patent Application No. PCT/EP2019/081714, mailed Jun. 24, 2020, 15 pages.

(Continued)

*Primary Examiner* — Brian R Gordon
(74) *Attorney, Agent, or Firm* — KDW Firm PLLC (57) ABSTRACT

A holder for holding one or more biological indicators and/or one or indicators and one or more thermocouples. The holder includes one or more basic parts, being at least one first basic part where one or more biological indicators and/or one or more thermocouples can be placed in the basic part. The basic part is provided at the location where the biological indicator or indicators can be located with one or more holes. The holder is provided with means for securing the one or more thermocouples and/or biological indicators in the holder. At least one of the one or more basic parts is flexible.

13 Claims, 6 Drawing Sheets

(56) References Cited

U.S. PATENT DOCUMENTS

| | | | | |
|---|---|---|---|---|
| 5,409,117 | A * | 4/1995 | Meador | A61B 10/007 422/561 |
| 5,531,966 | A * | 7/1996 | Brouwer | B01L 3/505 422/549 |
| 5,718,681 | A * | 2/1998 | Manning | A47G 21/183 239/33 |
| 5,801,010 | A | 9/1998 | Falkowski et al. | |
| 5,992,702 | A * | 11/1999 | Shapiro | G01F 11/28 222/211 |
| 6,284,549 | B1 * | 9/2001 | Guthrie | B01L 3/502 137/197 |
| 7,753,284 | B1 * | 7/2010 | Raitses | A47G 21/18 239/24 |
| 2002/0151889 | A1 | 10/2002 | Swanson | |
| 2008/0237246 | A1 * | 10/2008 | Choi | B65D 77/283 220/705 |
| 2013/0209993 | A1 * | 8/2013 | Aronowitz | B01L 3/5021 435/5 |
| 2014/0050424 | A1 * | 2/2014 | Hilsenrath | B65D 77/28 383/41 |
| 2014/0231335 | A1 * | 8/2014 | Kim | B01L 3/5635 210/512.3 |
| 2015/0072346 | A1 * | 3/2015 | Gellibolian | C12N 15/1017 435/287.2 |
| 2015/0305528 | A1 * | 10/2015 | Chen | A47G 19/2266 220/666 |
| 2017/0030811 | A1 * | 2/2017 | Gellibolian | G01N 1/10 |
| 2019/0374939 | A1 * | 12/2019 | Lee | B01L 3/5082 |
| 2021/0307547 | A1 * | 10/2021 | Perkins | A47G 21/18 |

OTHER PUBLICATIONS

Extended European Search Report for EP Application No. 24182518. 1, dated Oct. 10, 2024, 7 pages.

* cited by examiner

HOLDER FOR USE IN STERILISATION APPLIANCES

This is a national stage application filed under 35 U.S.C. § 371 of pending international application PCT/EP2019/081714, filed Nov. 19, 2019, which claims priority to Belgium Patent Application No. 2018/5808, filed Nov. 19, 2018 and European Patent Application No. 19202884.3, filed Oct. 13, 2019, the entirety of which applications are hereby incorporated by reference herein.

FIELD OF THE INVENTION

The present invention relates to a holder for one or more biological indicators and one or more thermocouples.

BACKGROUND OF THE INVENTION

More specifically, the invention will be used during the validation/qualification testing of sterilisation processes of production or other systems in the industry and is intended to:
- on the one hand, protect the biological indicators
- on the other hand, determine the exact position of the biological indicators and/or thermocouples in the system to be sterilised, as described in the relevant validation/qualification documents, for example test script, protocol, etc.; and this with the intention of increasing the reproducibility of the measurement results.

It is known that the proper functioning of some sterilisation processes of some industrial systems, such as for example a pharmaceutical installation, must be checked mandatorily and on a regular basis. This is done during the validation/qualification tests and is imposed by the authorities and inspection bodies of different countries with the aim of guaranteeing the safety and health of consumers.

Some examples of possible sterilisation processes used for industrial systems are:
- Steam sterilisation, for example for autoclaves, freeze dryers, tanks, transfer systems, formulation systems, filtration systems, sterilisation-in-place (SIP), etc.
- VHP sterilisation (Vaporised Hydrogen Peroxide) for example premises, airlocks, isolators
- Dry air sterilisation (dry heat or depyrogenation) for example for tunnels, ovens, etc.

For certain sterilisation processes, these validation/qualification tests must be performed using biological indicators and/or thermocouples.

A biological indicator is a carrier on which a certain and certified amount of resistant organic material (e.g. bacteria, spores, microbes, etc.) of a certain type (e.g. *Bacillus stearothermophilus*) has been applied and that may exist in different shapes and materials and in different packages (e.g. ampoules, strips, discs, etc.).

The type of biological indicator to be used is determined by the system to be sterilised, the sterilisation process used and the rules imposed by the authorities.

A thermocouple is a temperature sensor and consists of two wires of different metals or metal alloys that are connected to each other, preferably by fusion. If there is a temperature difference between the two contact points, a potential difference will arise, the magnitude of which depends on the metals used.

Thermocouples are available in various shapes and materials and the type to be used is determined by the system to be sterilised, the sterilisation process used and the rules imposed by the authorities.

Before the validation cycle, the biological indicators and/or thermocouples are installed in the system to be validated. A sterilisation cycle is then started and run through. At the end of the sterilisation cycle, the biological indicators and/or thermocouples are removed from the system and:
- On the one hand, the biological indicators are incubated to determine how much organic material has survived the cycle.
- On the other hand, the measurement data from the thermocouples is read out and the data processed to check whether the intended temperature and the data derived from it met the requirements.

Traditionally, biological indicators and thermocouples are attached in a relatively amateurish way in the systems to be validated. Sometimes these are simply placed in the system, but usually they are attached by affixing them to an inner wall of the system to be sterilised using tape, such as for example Kapton tape.

A disadvantage is that the biological indicator is easily damaged by this method of placement. For example, ampoules can easily break, spore strips in a glassine envelope are soaked by the steam and are torn or shredded on a regular basis.

As a result, contamination of the industrial system and consequently the product that is processed in the system, but also of the production environment (premises and the like), may occur.

If this happens, both the industrial system and the production environment must be repeatedly cleaned and the validation test repeated.

As a result, the industrial system is out of service for a long time, which is of course undesirable.

Moreover, any residual glue residues from the used tape can also cause contamination, with the aforementioned disadvantages as a result.

Another disadvantage is that the measurements are not always reproducible because of these amateurish placement methods in combination with 'human error'.

Due to the current method of placement, the chance that the biological indicator and thermocouple were placed in exactly the same way during the subsequent validation cycles is very small. Partly because the different validation cycles are often carried out by different people, the position of biological indicators and/or thermocouples can often deviate very significantly from those of the previous validation test.

Knowing that a small deviation in position with just a few millimetres can already lead to large deviations in the results, it is therefore logical that the placement can be the cause of the non-reproducibility of the results.

However, for certain applications, such as in the pharmaceutical sector, reproducibility is crucial in the context of quality and validation controls.

SUMMARY OF THE INVENTION

The object of the present invention is to provide a solution to at least one of the aforementioned and/or other disadvantages. It is an advantage of embodiments of the present invention that a holder, e.g. for holding thermocouples, biological indicators and/or other elements to be positioned in a treatment system such as for example a sterilisation system, is provided that allows accurate and reproducible positioning.

It is an advantage of at least some embodiments of the present invention that the use of these systems and methods results in higher patient safety.

It is an advantage of at least some embodiments of the present invention that the systems and methods result in one or more of:

Better control of the positioning of thermocouples and biological indicators, for example.

This increases the reproducibility.

Easy use

A high accuracy

Time savings

Less or minimal stress on thermocouples, which in itself also increases reproducibility Better protection of biological indicators, for example, which reduces the chance that fragments of these biological indicators will end up in the product.

A smaller chance of obstruction of the flows during the process

A smaller chance of damage to the treatment system

There can be no residues of Kapton adhesive tape, so that no residues of this adhesive tape can end up in the final product.

It is an advantage of embodiments of the present invention that it can be cost effective because it results in one or more of the following advantages: the treatment system is out of operation less often, the general costs are low, the treatments are more frequently right the first time so that processes have to be repeated less often, inspections such as, for example, of the final products and/or the treatment system have to be done less often, etc.

It is an advantage of embodiments of the present invention that a precise positioning of thermocouples and biological indicators or other elements to be placed can be done by means of a tube-shaped element with specific diameter, such as, for example, ¾ inch, 1 inch, 1.5 inches, 2 inches etc.

In one aspect, the present invention relates to a holder suitable for holding for one or more biological indicators and/or one or more thermocouples, characterised in that the holder consists of one or more basic parts, there being at least one first basic part wherein one or more biological indicators and/or one or more thermocouples can be placed in the first basic part, wherein the first basic part is provided with one or more holes at the location where the biological indicator or indicators will be located, and wherein the holder is provided with means for securing the one or more thermocouples and/or biological indicators in the holder and wherein the first basic part is flexible.

In one aspect, the present invention relates to a holder for one or more biological indicators and one or more thermocouples, characterised in that the holder consists of one or more component parts, being at least one first hollow basic part, wherein one or more biological indicators and one or more thermocouples can be placed in the basic part, wherein the basic part is provided with one or more holes at the location of the biological indicator or indicators, wherein the holder is provided with means for securing the one or more thermocouples and biological indicators in the holder.

Embodiments according to the above aspects also may have one or more of the following characteristics.

The holder can be suitable for any kind of element that it is desirable to place in a treatment system and its use is therefore not limited to one or more biological indicators and/or one or more thermocouples.

The aforementioned holes in the basic part will ensure that the biological indicator, when fitted in the holder, is at least partially free, so that the biological indicator can be exposed to the sterilisation process, i.e. to steam, hydrogen peroxide, etc.

An advantage is that with the aid of the holder, the biological indicator can be manipulated or exposed to the sterilisation process without damage, since it is protected by the holder.

The same applies to the thermocouple, although the thermocouple is typically mounted with the measuring head out of the holder.

Moreover, the holder can be attached in and removed from the system to be sterilised without the risk of damaging a biological indicator placed in the holder with all the aforementioned adverse consequences.

Preferably the holder is provided with means for mounting or positioning the holder.

This will improve the reproducibility of the results of biological indicators and thermocouples, because the position of biological indicators and thermocouples with respect to the system is guaranteed by means of the aforementioned means to be able to attach or position the holder and thereby can be resumed more easily during different validation cycles.

It will be clear that the basic part can take on different dimensions and shapes.

Preferably, the holder consists of two or more basic parts, being at least one first basic part, which may be a hollow part, and at least one sealing cap that is or can be attached to the basic part.

The holder can of course also comprise two sealing caps and a basic part which can be closed at two ends by the aforementioned sealing caps. In or on the first basic part a biological indicator can be placed, whereby by applying the sealing cap or sealing caps it can be ensured that the biological indicator is secured in the holder.

In a practical embodiment, the sealing cap is attached to the basic part. This means that the basic part and the sealing cap are connected.

In another practical embodiment, a passage is provided in the sealing cap for the thermocouple.

The thermocouple can be placed or pushed into the holder via the passage.

If the holder is provided with two sealing caps, these are preferably both provided with a passage, so that the thermocouple can be arranged with its measuring head protruding from the holder. This will enable the measuring head to measure accurately.

In an alternative embodiment, the holder is made up of two halves which are attached to each other.

In such an embodiment, the holder does not have to be provided with one or more sealing caps to be able to place a biological indicator in the holder. Both halves of the holder can simply be folded open to place the biological indicator in the holder and then close both halves again. In some embodiments this could be made as two hinging parts, although this is not required and embodiments are not limited thereto.

The holder or a basic part thereof can be pliable, also referred to as flexible. This has the advantage that the holder can easily be placed. The holder, or a basic part thereof, can be tube-shaped. Alternatively, the holder or a basic element thereof can also be flat or flatter, such as in sheet form or such as a flattened tube.

When in embodiments of the present invention the term 'flexible' or 'pliable' is used, this refers to the fact that the holder or a basic part thereof can bend or fold, for example at an angle of at least 45°, preferably at least 90°, possibly about 180° or more.

In a preferred alternative embodiment, the basic part is stretchable and pliable.

This has the advantage that the holder can easily be pushed through curved tubes and pipes of the pharmaceutical installation, up to the required location.

It will also be possible to attach the holder around pipes or valves or the like.

In one aspect, the present invention also relates to an adhesive element for the attachment of a holder suitable for one or more biological indicators and/or one or more thermocouples as described above.

In yet another aspect, the present invention relates to a kit of parts consisting of a holder and an adhesive element as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. The term "comprising" therefore covers the situation where only the stated features are present and the situation where these features and one or more other features are present. Thus, the scope of the expression "a device comprising means A and B" should not be interpreted as being limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In one aspect the present invention relates to a holder suitable for holding for one or more biological indicators and/or one or more thermocouples. Whereas in embodiments of the present invention reference is made to a holder for one or more biological indicators and/or one or more thermocouples, reference is made to a holder that is suitable for holding one or more biological indicators and/or one or more thermocouples but is not limited thereto. For example, the holder may be used for any type of indicators, such as for example chemical indicators, nuclear indicators and alike.

The holder according to embodiments of the present invention consists of one or more basic parts, there being at least one first basic part wherein one or more biological indicators and/or one or more thermocouples can be placed in the first basic part. The first basic part further is provided with one or more holes at the location where the biological indicator or indicators will be located, and the holder is provided with means for securing the one or more thermocouples and/or biological indicators in the holder and wherein the first basic part is flexible. The first basic part may be a hollow basic part. The first basic part may be a beam-shaped or cylindrically shaped part or may have the shape of a flat tube. Different embodiments will be illustrated below.

Figure 1:
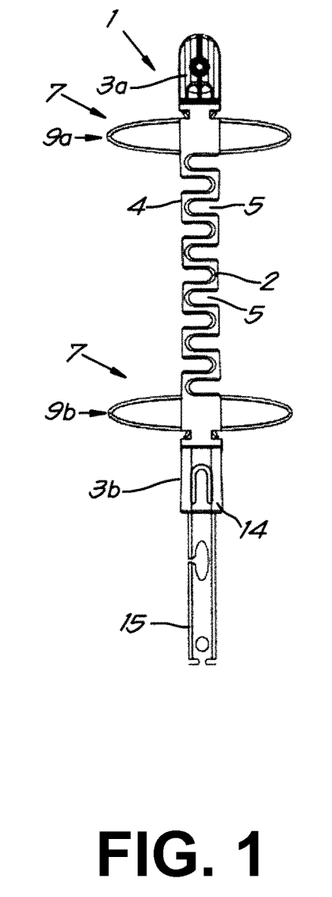
FIG. 1 schematically represents a holder according to the invention.

FIG. 1 represents a possible embodiment of a holder 1 according to the invention.

Figure 2:
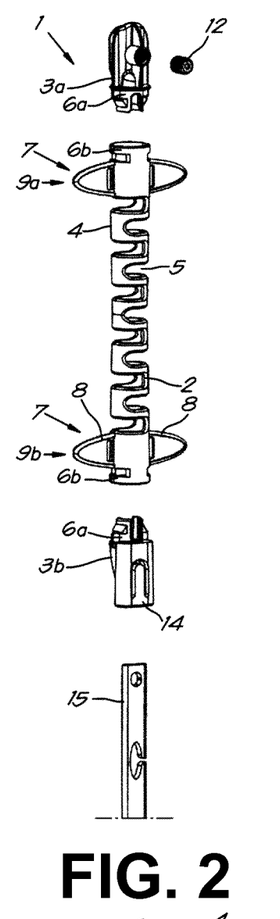
FIG. 2 represents the holder of FIG. 1 in perspective, but in exploded state.

FIG. 2 shows the same holder 1, but then in exploded or disassembled state.

The holder 1 substantially comprises a first basic part 2, e.g. a hollow basic part, and two sealing caps 3a, 3b, namely a first sealing cap 3a and a second sealing cap 3b.

There is a possibility that there is only one sealing cap 3a, 3b and that the end where the second sealing cap 3b is applied in FIG. 1 is closed.

It is also possible that there is no sealing cap 3a, 3b and that the holder 1 thus only comprises the basic part 2.

Although in the example shown the sealing caps 3a, 3b are separate parts of the holder 1, there is a possibility that the sealing caps 3a, 3b are hingedly attached to the basic part 2 by means of a hinge, fully integral hinge or the like.

In this case, but not necessarily, the basic part 2 is cylindrical.

A number of holes 5 are provided in the jacket 4 of the cylinder, so that a biological indicator, which is arranged in the basic part 2, is free.

In this case the holes 5 consist of notches which are arranged alternately on two opposite sides.

This specific design of the holes 5 will ensure that the basic part 2 is extensible and flexible. Alternatively, the basic part 2 can be made from a flexible material, such as, for example, a rubber.

The basic part 2 and the sealing caps 3a, 3b are preferably made of sterilisable materials, such as, for example, PVDF (Polyvinylidene Fluoride), PEEK (polyether ether ketone), PTFE (polytetrafluoroethylene), or ULTEM 1010. These are so-called USP CLASS VI materials that can be considered medical or pharmaceutical materials.

As can be seen in FIG. 2, the basic part 2 and the sealing caps 3a, 3b can in this case be connected to each other or attached to each other by being provided with complementary details 6a, 6b that allow the sealing caps 3a, 3b to snap into place onto the basic part 2.

In this case and preferably, the attachment between the basic part 2 and the sealing cap 3a, 3b is inseparable.

It is also possible that the basic part 2 and the sealing caps 3a, 3b can be connected to each other by means of interlocking.

This interlocking can be realised by binding the basic part 2 and the sealing caps 3a, 3b to each other with the aid of a magnetic closure or the like.

In this case, but not necessarily, the holder 1 is provided with means 7 for attaching or positioning the holder.

In the shown example of FIGS. 1 and 2, these means 7 consist of protrusions 8 at at least one end 9a, in this case at both ends 9a, 9b, of the holder 1, which are located on either side of the holder 1.

Via these protrusions 8 the holder 1 will be able to be supported against the inner wall of a tube or pipe, so that the holder 1 does not lie on the bottom of the pipe or tube.

This is an advantage of some embodiments, because it is possible to prevent the holder 1, containing the biological indicator and thermocouple, from making contact with condensation, which would influence the measurement results.

The protrusions 8 are fin-shaped in this case. This means that there are only two contact points to minimise the condensation flow.

Figure 3:
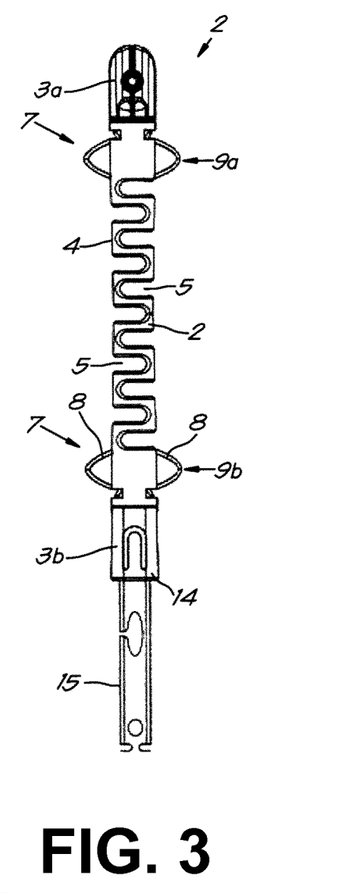
FIG. 3 represents an alternative embodiment of FIG. 1.

FIG. 3 shows an alternative embodiment in which the protrusions 8 are arcuate. This will ensure that the passage through the tube or pipe remains maximally open for the steam from the sterilisation cycle.

Although the protrusions 8 are arranged on the basic part 2 in this case, it is not excluded that they are arranged on the sealing caps 3a, 3b.

Figure 4:
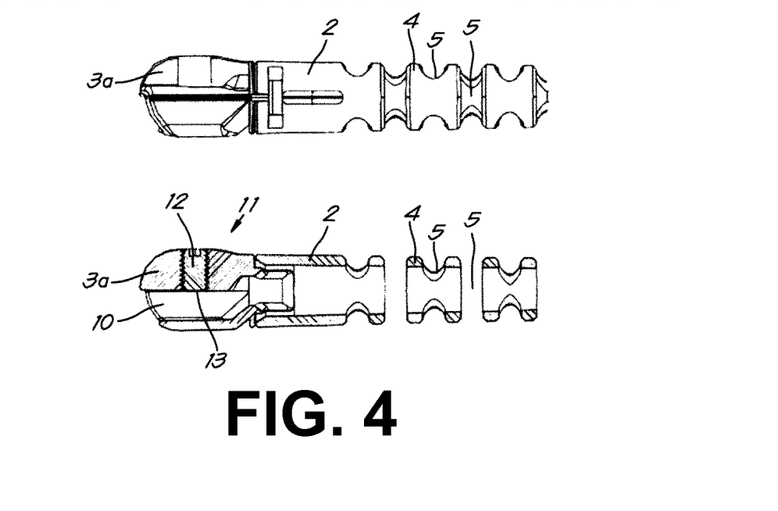
FIG. 4 represents a sealing cap from FIGS. 1 and 2 in detail.
Figure 5:
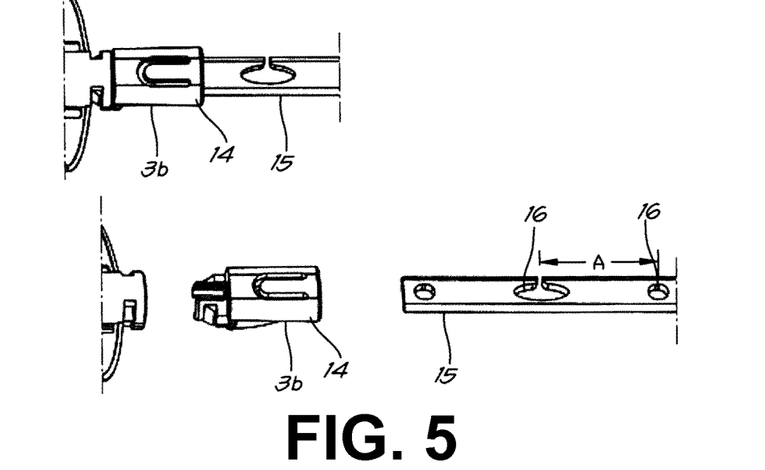
FIG. 5 represents a sealing cap from FIGS. 1 and 2 in detail.

One of the sealing caps 3a is shown in more detail in FIG. 4, the other sealing cap 3b in FIG. 5.

A passage 10 for the thermocouple is each time provided in the sealing caps 3a, 3b.

In this way the thermocouple can be passed through the second sealing cap 3b, then through the basic part 2 and finally through the first sealing cap 3a, the measuring head sticking out of this first sealing cap 3a.

Furthermore, the sealing cap 3a of FIG. 4 is provided with means 11 for securing the thermocouple in the holder 1, so that the thermocouple cannot slide out of the holder 1 unintentionally or undesirably.

In the example of FIG. 4, these means 11 comprise a screw 12 with which the thermocouple, when it is arranged through the passage in the sealing cap, can be clamped by tightening the screw 12.

The screw 12 is positioned such that when it is tightened it enters the passage and with the end 13 will act on the thermocouple.

An advantage of such an embodiment of the means 11 is that any thickness of thermocouple can be fixed, since depending on the thickness of the thermocouple the screw 12 can be screwed in deeper or less deeply.

The sealing cap 3b of FIG. 5 is provided with a coupling 14 for a rod 15, bar or the like, which is also shown in FIG. 5.

The rod 15, bar or the like is rigid.

This is advantageous if the holder 1 is arranged in a tube or pipe, because the rod 15, bar or the like can then be used to slide or push the holder 1 to the desired location.

In the example shown, this rod 15 is provided with attenuations 16 which are at a regular distance A from each other.

The attenuations 16 are in this case, but not necessarily, in the form of notches.

This will allow the rod 15 to be easily broken off at the desired length. This will ensure that the rod 15 can be used as a spacer or distance meter, so that the holder 1 can be placed at the same location with each validation cycle.

Moreover, the thermocouple can be woven into the notches, so that the rod 15 and the thermocouple can no longer move relative to each other.

In this way the thermocouple can be clamped between flanges of the tube or pipe and in this way keep the holder 1 in place during the sterilisation, against the flow of the steam. It can thus be certain that the holder 1 remains in the same place.

The use of the holder 1 is very simple and as follows.

Assuming a basic part 2 of two sealing caps 3a, 3b, as shown in FIG. 2, a biological indicator is provided in the basic part 2.

The biological indicator is rolled up and slid into the holder 1.

The two sealing caps 3a, 3b are then fitted by snapping into place in the basic part 2, as shown in FIG. 1.

This figure also clearly shows how the biological indicator is at least partially free because the holder 1 is provided with holes 5 at the location of the biological indicator.

This will allow the biological indicator to be exposed to the steam or gas during the sterilisation process.

It is also clearly visible that the biological indicator is retained in the basic part 2 by sealing caps 3a, 3b.

The thermocouple can then be applied by passing it through the passage 10 of the second sealing cap 3b, then through the basic part 2 and finally through the first sealing cap 3a.

The thermocouple can then be fixed by tightening the screw 12.

The rod 15 is fitted in the other sealing cap 3b, whereby it is first broken off to the desired length.

Subsequently, the holder 1 can be placed in the pharmaceutical machine at the desired location.

Figure 6:
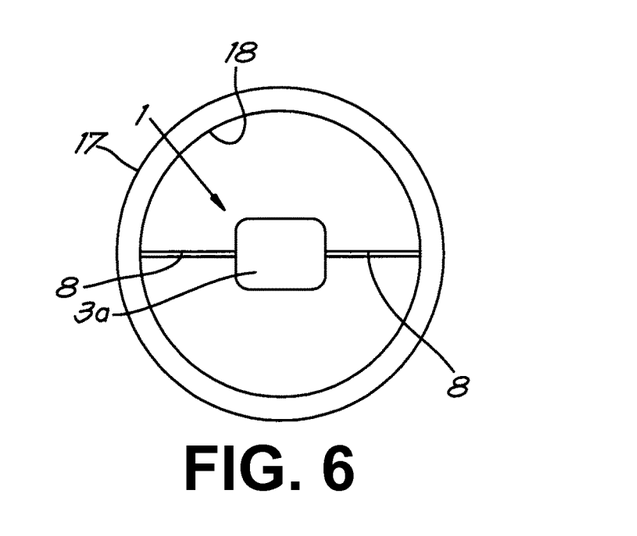
FIG. 6 represents the holder of FIG. 1 applied in a conduit of a pharmaceutical installation.

FIG. 6 shows how the holder 1 is arranged in a pipe 17, wherein the fin-shaped protrusions 8 make contact with the inner wall 18 of the pipe 17.

Due to the correct dimensions of the protrusions 8, the holder 1 will not touch the inner wall 18, but will, as it were, float in it, supported by the protrusions 8.

With the aid of the rod 15, the holder 1 can be slid into the pipe 17 to the desired location.

The biological indicator and the thermocouple will therefore not lie in any condensation on the bottom of the pipe 17, nor will they make contact with the inner wall 18 of the pipe 17.

Both aforementioned issues may have a negative impact on the measurements.

During the sterilisation process the biological indicator will be exposed to steam or gas that can reach the biological indicator via the holes 9 and the thermocouple will be able to take the necessary measurements.

After the sterilisation process, the holder 1 can be removed from the machine. Because the biological indicator is protected in the holder 1, it will not be damaged. The thermocouple will also be protected by the holder 1.

The sealing caps 3a, 3b can then be detached from the basic part 2. Since the sealing caps 3a, 3b are not releasably arranged, it will be necessary to work destructively for this purpose by breaking the sealing caps 3a, 3b and/or the basic part 1. The biological indicator can then be removed from the basic part and analysed.

The thermocouple can then also be removed from the basic part 2a.

Figures 7, 8:
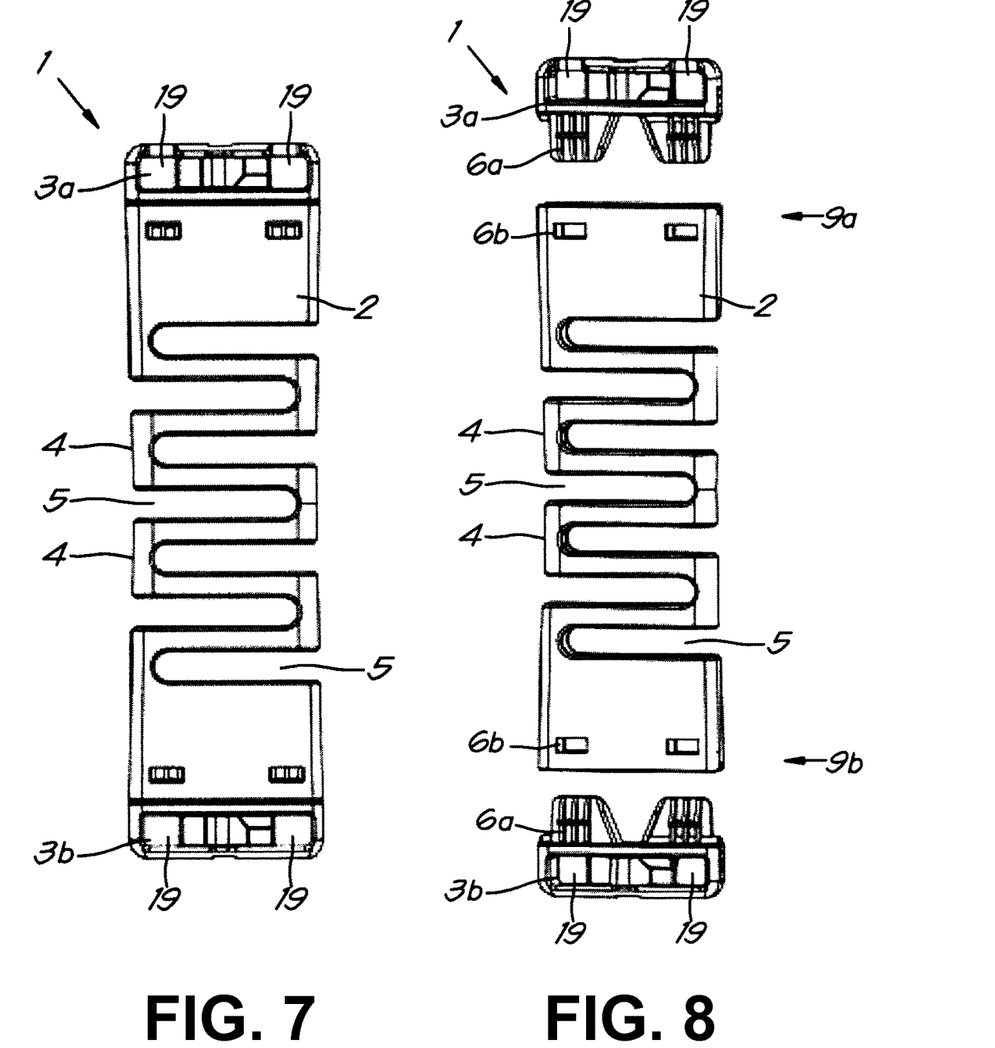
FIG. 7 schematically and in perspective represents an alternative embodiment of a holder according to the invention.
FIG. 8 represents the holder of FIG. 7, but in exploded state.
Figure 9:
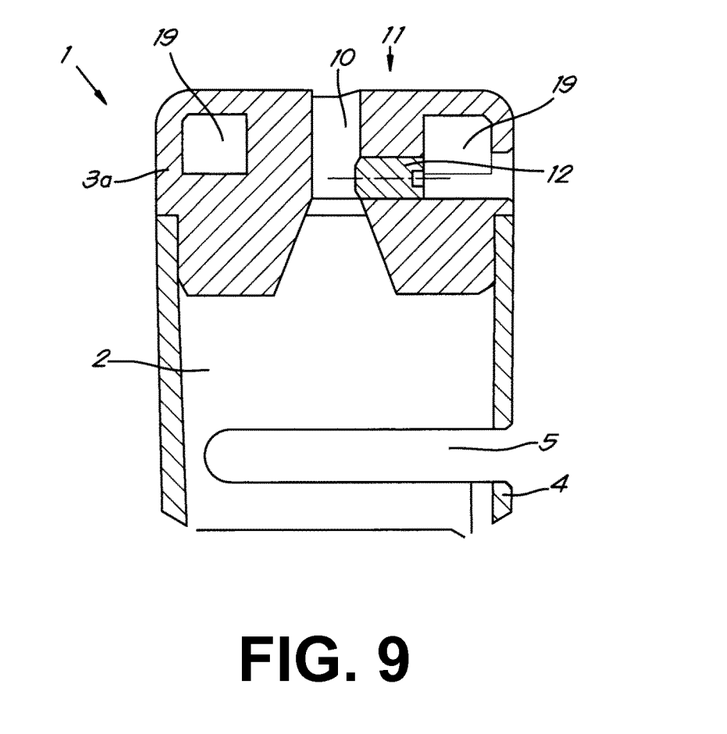
FIG. 9 represents a sealing cap from FIGS. 7 and 8 in detail.

FIGS. 7 to 9 show an alternative embodiment of a holder 1 according to the invention, wherein in this case basic part 2 is beam-shaped instead of cylindrical.

More specifically, the shape is a flat, wide beam, i.e. the width is greater than the height. The length can be variable.

The shape of the sealing caps 3a, 3b is of course adapted to the beam-shaped basic part.

Although in this case there are also two sealing caps 3a, 3b, it is not excluded that there is only one sealing cap 3a.

Both sealing caps 3a, 3b are provided with a passage 10 for the thermocouple, one of the sealing caps 3a being provided, as in the previous example, with screw 12 for fixing the thermocouple.

In this case, the means 7 for attaching or positioning the holder 1 are designed in the form of openings 19 which are provided in the sealing caps 3a, 3b.

Via these openings 19 the holder 1 can be fixed to hooks or the holder 1 can be tied down with the aid of cable ties or the like.

Because the holder 1 is also stretchable or flexible in this case, it is possible to tie the holder 1 around a tube or pipe in the pharmaceutical installation with cable ties.

Alternatively, the holder 1 can also be fitted over two or four hooks, the hooks being at a suitable distance from each other.

This distance is preferably somewhat greater than the distance between the openings 19 in the sealing caps 3a, 3b, so that the holder 1 must be slightly stretched in order to be able to hang it.

Figure 10:
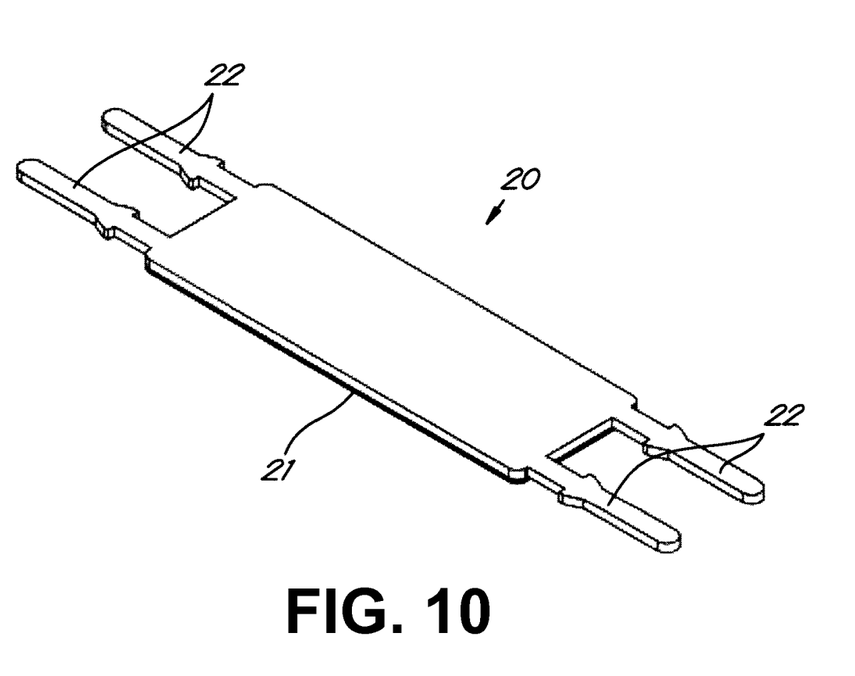
FIG. 10 schematically represents a possible embodiment of an adhesive mat.

The aforementioned openings 19 can also be used for an adhesive mat 20.

Such an adhesive mat 20 can serve to be able to attach or position the holder 1 in the pharmaceutical installation and is provided on one side with an adhesive strip 21 to be able to attach the holder 1 to a surface.

An example of such an adhesive mat 20 is shown in FIG. 10.

The adhesive mat 20 can be attached to the holder 1 by means of the belts 22 or the like provided for this purpose, which can be guided through the openings 19 in the sealing caps 3a, 3b.

It is also possible that these openings 19 are situated at the ends of the basic part 2 or if there is only one sealing cap 3a, 3b, it is possible that the openings 19 are provided at one end 9a of the holder 1 in the sealing cap 3a and at the other end 9b in the basic part 2 itself.

Preferably, the dimensions of the adhesive mat 20, and in particular the length, are somewhat smaller than the dimensions of the holder 1.

As a result, the holder 1, when applying the adhesive mat against a surface, will become convex, so that it does not come into contact with the wall or bottom of the pharmaceutical installation.

This will ensure that the measurements are not influenced by the wall or by condensation that forms on the bottom.

Instead of providing sealing caps 3a, 3b with openings 19 with which the holder 1 can be fixed or for an adhesive mat 20, one of the sealing caps 3a, 3b, or both, can be provided with a footrest or support legs, or separate footrests or support legs can be provided that can be attached to the sealing cap 3a, 3b.

In this way the holder can be placed on a horizontal surface.

Depending on the design of the footrests or support legs, the holder 1 will be placed horizontally or vertically.

Figure 11:
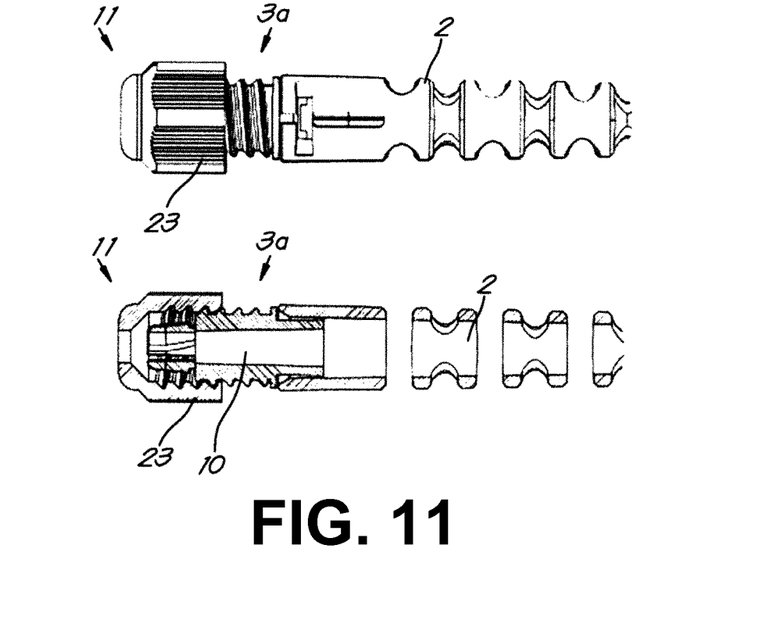
FIGS. 11 and 12 alternative embodiments of FIG. 4.
Figure 12:
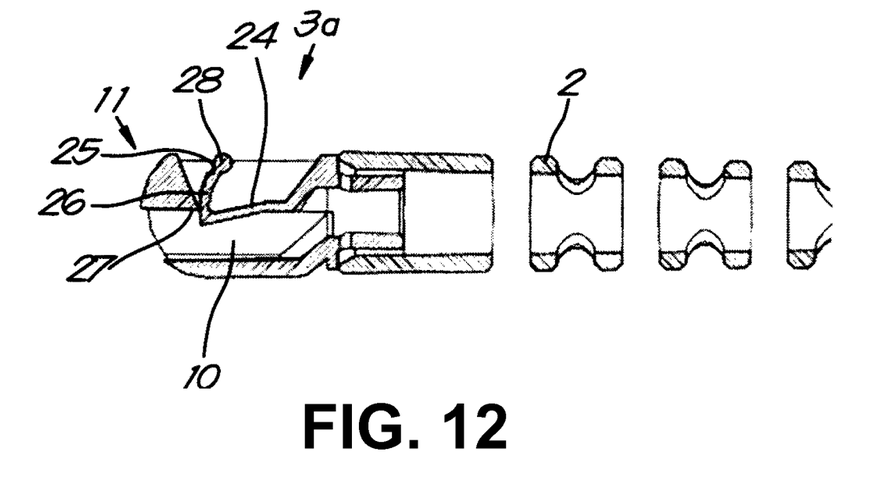

FIGS. 11 and 12 represent alternative embodiments of FIG. 4.

FIG. 11 shows that the sealing cap 3a in this case is provided with a swivel 23, through which the thermocouple is guided.

In other words, the aforementioned passage 10 is integrated in the swivel 23.

In this way the thermocouple can be fixed in the swivel 23.

FIG. 12 represents another alternative embodiment of the aforementioned means 11, which in this case comprise a lip 24 which can be pressed into the passage 10.

The lip is provided with a leg 25 with ridges 26, which abut against a stop 27 provided for this purpose in the sealing cap 3a and thus prevent the lip 24 from coming loose again.

When a thermocouple is arranged through the passage 10, it will be clamped by the lip 24.

To release the lip 24 again in order to be able to remove the thermocouple, the end 28 of the leg 25 of the lip 24 can be pulled on in order to raise the lip again.

The present invention is by no means limited to the illustrative embodiments and embodiments shown in the figures, but a holder according to the invention for one or more biological indicators and/or one or more thermocouples can be realised in all shapes and sizes without departing from the scope of the invention.

Thus, in some embodiments, the holder or one or more basic parts thereof may be tubular. This tube shape can be obtained in various ways, for example by providing a spiral-shaped element, by providing a tubular element with notches so that it is flexible, etc. It should be noted that the cross-section of this tube shape does not have to be circular, but could possibly also have a square, rectangular, elliptical, oval, polygonal shape.

In other embodiments, the holder or one or more basic parts thereof can thus be flat or plane, such as sheet-shaped or such as a flattened tube. This can, for example, conveniently position elongated strips with one or more biological indicators.

As described above, an adhesive element can also be provided for the holder, wherein the adhesive element can be adhered to the treatment appliance. In some embodiments, the dimensions of the holder and of the adhesive element are such that the holder is clamped in the adhesive element so that there is no or almost no contact between the biological indicators, thermocouples or other elements to be positioned on the one hand and the treatment appliance on the other. The use of an adhesive element, sometimes also described above as adhesive mat, can be used for both tubular and sheet-shaped or flat embodiments.

Figure 13:
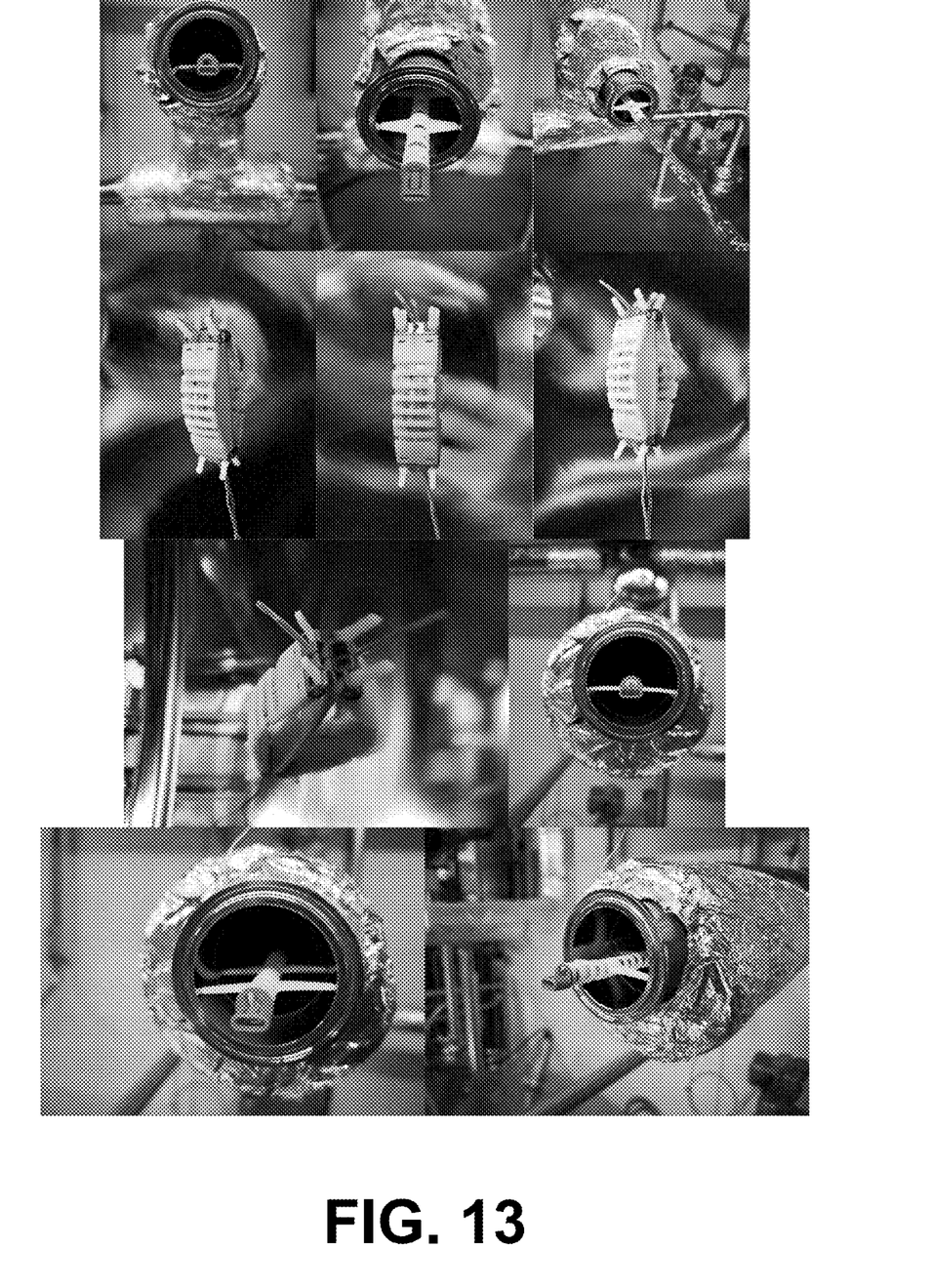
FIG. 13 shows some photos of embodiments of the present invention.

FIG. 13 represents some photos showing systems as in embodiments of the present invention built into an illustrative treatment system. Tubular holders can be seen in some of these photos, while flat embodiments can be seen in other photos. Furthermore, embodiments with spacers are also represented, which allow, for example, the thermocouple, one or more other biological indicators or other elements to make no or only limited contact with the treatment system. Also in some photos adhesive elements can be seen, sometimes also described above as adhesive mats.

In one aspect of the invention, the invention also relates to an adhesive element for the attachment of a holder suitable for one or more biological indicators and/or one or more thermocouples. In yet another aspect, the invention relates to a kit of parts consisting of a holder and an adhesive element as described above.

The invention claimed is:

1. A holder arranged and configured to receive a thermocouple and a biological indicator, the holder comprising:
   a hollow tubular element arranged and configured to receive at least a portion of the thermocouple, a first sealing cap with a passage formed therein to enable the thermocouple to pass therethrough, and a second sealing cap, wherein the hollow tubular element is closed at first and second ends thereof by the first and second sealing caps, respectively, and wherein the hollow tubular element comprises:
   a jacket and a plurality of notches formed in the jacket of the hollow tubular element, the plurality of notches being arranged alternately on two opposite longitudinal sides of the hollow tubular element, thereby ensuring that the hollow tubular element is extensible and flexible, and that the biological indicator, which is arranged in the hollow tubular element, is free for exposure to a sterilization process.

2. The holder of claim 1, wherein the hollow tubular element has a cross-section selected from a circular, square, rectangular, elliptical, oval, or polygonal shape.

3. The holder of claim 1, wherein the hollow tubular element is arranged and configured to bend or fold at an angle of at least 45° to greater than 180°.

4. The holder of claim 1, wherein the first sealing cap is removably attached to the hollow tubular element.

5. The holder of claim 1, further comprising:
   a pair of protrusions arranged on one of the hollow tubular element, the first sealing cap, or the second sealing cap of the holder, the pair of protrusions arranged and configured to attach the holder.

6. The holder of claim 4, wherein the first sealing cap and the second sealing cap each comprise openings arranged and configured to attach or position the holder, wherein said openings are configured to be able to attach the holder to hooks or to be able to attach the holder using cable ties.

7. The holder of claim 5, further comprising:
   an adhesive mat and
   an adhesive strip on at least one side of the adhesive mat, wherein the adhesive strip is arranged and configured to attach the holder to a surface; and
   wherein the adhesive mat is attached to the holder by being guided thereto via holes at the ends of the hollow tubular element or on one of or both of the first sealing cap and the second sealing cap.

8. The holder of claim 7, wherein the adhesive mat has a dimension that is smaller than a corresponding dimension of the holder.

9. The holder of claim 4, wherein the first sealing cap is removably attached to the hollow tubular element by interlocking or complementary features that allow the first sealing cap and the hollow tubular element to snap into place on each other.

10. A kit of parts comprising:
    the holder of claim 1, and
    an adhesive element.

11. The holder of claim 1, wherein the first and second sealing caps each comprise a passage configured to receive the thermocouple.

12. The holder of claim 1, wherein the first sealing cap comprises means to secure the thermocouple in the holder.

13. The holder of claim 12, wherein the means to secure the thermocouple in the holder comprise a screw, a swivel, or a lip.

* * * * *